United States Patent [19]
Trueck et al.

[11] Patent Number: 5,958,498
[45] Date of Patent: Sep. 28, 1999

[54] MAYONNAISE-LIKE PRODUCT AND A PROCESS FOR ITS MANUFACTURE

[75] Inventors: Hans Uwe Trueck, Stuttgart, Germany; Lydia Campbell, Hillegom, Netherlands

[73] Assignee: Nestec S. A., Vevey, Switzerland

[21] Appl. No.: 08/798,309

[22] Filed: Feb. 7, 1997

[30] Foreign Application Priority Data

Feb. 8, 1996 [EP] European Pat. Off. ............. 96200272

[51] Int. Cl.$^6$ ........................... A23L 1/035; A23L 1/0562
[52] U.S. Cl. .............................................. 426/605; 426/613
[58] Field of Search .................................. 426/605, 613, 426/609

[56] References Cited

U.S. PATENT DOCUMENTS

| | | |
|---|---|---|
| 3,892,873 | 7/1975 | Kolen et al. . |
| 4,140,808 | 2/1979 | Jonson ..................................... 426/605 |
| 4,143,174 | 3/1979 | Shah ........................................ 426/605 |
| 4,302,474 | 11/1981 | Mikami ................................... 426/613 |
| 4,304,795 | 12/1981 | Takado ................................... 426/613 |
| 4,650,690 | 3/1987 | Bams ...................................... 426/605 |
| 4,696,826 | 9/1987 | Leusner .................................. 426/613 |
| 4,734,287 | 3/1988 | Singer .................................... 426/605 |
| 4,762,726 | 8/1988 | Soucie .................................... 426/613 |
| 4,820,541 | 4/1989 | Haring .................................... 426/603 |
| 4,961,953 | 10/1990 | Singer et al. . |
| 4,985,270 | 1/1991 | Singer .................................... 426/613 |
| 5,080,921 | 1/1992 | Reimer . |
| 5,096,730 | 3/1992 | Singer et al. . |
| 5,102,681 | 4/1992 | Singer et al. . |
| 5,139,811 | 8/1992 | Singer .................................... 425/605 |
| 5,322,702 | 6/1994 | Selinger ................................. 426/613 |
| 5,350,590 | 9/1994 | McCarthy et al. . |
| 5,494,696 | 2/1996 | Holst et al. . |
| 5,652,011 | 7/1997 | Heertje ................................... 426/601 |
| 5,773,072 | 6/1998 | Campbell ............................... 426/613 |
| 5,837,308 | 11/1998 | Campbell ............................... 426/613 |

FOREIGN PATENT DOCUMENTS

0515246 A2  5/1992  European Pat. Off. .

OTHER PUBLICATIONS

Jost 1986 J of Food Science 51(2) 440.

*Primary Examiner*—Carolyn Paden
*Attorney, Agent, or Firm*—Vogt & O'Donnell LLP

[57] ABSTRACT

A mayonnaise-like emulsion product has a component composition which includes edible oil, sugar and salt components, first and second emulsifier components and an acetic acid or vinegar component and by weight, the oil component is in an amount of from 55% to 85%, the sugar component is in an amount of at least 1%, the salt component is in an amount of at least 0.5% and the acetic acid or vinegar component is in an amount of from 0.1% to 20% so that the emulsion has a pH of from 2 to 5, the first emulsifier component being soya protein, pea protein, skimmed milk powder, buttermilk and/or casein, and wherein heat denaturable proteins of the first emulsifier are denatured to a degree of denaturation between 70% and 80%, and the second emulsifier component being a monoglyceride, an ethoxylated monoglyceride, a polyoxyethylene sorbitan, glycerin, a fatty acid monoester and/or a fatty acid diester. The emulsion product is prepared by mixing water, sugar, salt and the first and second emulsifiers, heating the mixture so prepared to denature proteins in the mixture which are heat-denaturable to a degree of denaturation between 70% and 80%, cooling the heat-treated mixture, adding the acetic acid or vinegar to acidify the cooled mixture, adding an edible oil to the acidified mixture and then homogenizing the oil-containing product.

25 Claims, No Drawings

MAYONNAISE-LIKE PRODUCT AND A PROCESS FOR ITS MANUFACTURE

BACKGROUND OF THE INVENTION

The invention concerns a mayonnaise-like product with a high fat content, with an emulsifier other than egg yolk and with a low pH and a process for its manufacture.

The preparation of acid oil-in-water emulsions with high fat content and with emulsifiers other than egg yolk is known in the art. Usually, emulsions prepared with low molecular weight (LMW) emulsifiers have low viscosity. Examples are emulsions prepared with ethoxylated monoglycerides, diacetyl tartaric acid ester of mono- and diglycerides and hydrolysed lecithins. High viscosity emulsions are possible with polyoxyethylene-(20)-sorbitan monostearate at concentrations higher than 1%, but the taste is unacceptably bitter. Generally, viscosity is increased in oil-in-water emulsions by using thickening or gelling agents like polysaccharides, gums or cold swelling starches, but when it is used in high fat emulsions prepared with LMW emulsifiers, the result is poor texture or destabilisation of the emulsion.

On the other hand, high molecular weight (HMW) emulsifiers (proteins) are known for their emulsifying function and ability to lend viscosity to emulsions. Generally, milk proteins combined with thickeners are used for this purpose in low to medium fat emulsions (1–55% fat). Emulsions with higher fat content are difficult to prepare because the complex structural properties of proteins directly influence their emulsifying functions. In the food industry, acidified protein solutions are advantageous for industrial processing due to microbiological safety. Regarding the effects of acid, proteins can be divided in two general categories:

1. Those with a generally flexible, random coiled structure like casein and skim milk powder, which precipitate upon direct acidification and thereby lose their emulsifying properties. This makes the emulsification with oil and the production of high fat emulsions with directly acidified solutions impossible.

2. The proteins with generally compact, inflexible structures, like whey, soya and pea proteins, which are all mixtures of different types of serum albumins and globulins. Although these proteins generally do not precipitate upon acidification, they still undergo structural changes at the iso-electric pH, yet in most cases, emulsification with oil is still possible. High fat emulsions prepared in this way have high viscosity, but they become gelatinised during storage and result in rough texture.

In the case of U.S. Pat. No. 3,892,873, supplementary emulsifying agents, like ethoxylated monoglycerides, polyoxyethylene sorbitans, mono- and diesters of higher fatty acids and glycerin, may be used.

It is known that emulsifying properties of proteins are improved when they are first emulsified with oil before heating and/or acidification. The drawbacks of this solution is first that it is not possible to operate continuously but batchwise and secondly that there is a greater chance of contamination.

SUMMARY OF THE INVENTION

The object of the present invention is to allow the manufacture of a mayonnaise-like product with a high molecular weight emulsifier, with a high fat content and wherein it is possible to operate the heating and/or the acidification of the basic solution before the emulsification with the oil, while retaining the emulsifying properties of the used proteins.

The invention concerns a mayonnaise-like product with a pH from 2 to 5, comprising from 55 to 85% fat, at least 0.1% milk proteins or vegetable proteins denatured at a degree between 70 and 80%, at least 1% sugar and 0.5% salt and from 0.1 to 20% vinegar. The water content is normally comprised between 10 and 20%.

The mayonnaise-like product, according to the invention has a high fat content, a low pH, contains emulsifiers except egg yolk, has high viscosity, smooth texture, good stability and taste. An advantage of such emulsion is the supply of high fat spreadable products in third world countries made with locally available raw materials. The product could also be consumed for health reasons since it has a reduced cholesterol content. Due to the absence of the chemically complex raw material egg yolk, the shelf-life of these products are also improved.

The invention also provides a process for the manufacture of the mayonnaise-like product described which includes the denaturation of the protein emulsifier in the presence of salt and sugar, which prevents gel formation and enables direct acidification procedures.

The process of the invention, comprises preparing a solution in water containing from 5 to 40% milk proteins or vegetable proteins, from 5 to 40% sugar and from 3 to 10% salt, heating said mixture, cooling the mixture, acidifying the product obtained with from 0.1 to 20% with an acidifying agent selected from acetic acid and vinegar, and the acidified product is homogenized with an oil to obtain a fine emulsion.

DETAILED DESCRIPTION OF THE INVENTION

In the present description, all the percentages are given in weight. The milk proteins are taken from the group consisting of skim milk, particularly skim milk powder, buttermilk, casein and whey proteins. The vegetable proteins are taken from the group consisting of soya proteins, pea proteins and any combination of these proteins.

The whey proteins used consist of undenatured whey protein concentrate (WPC) obtained by any separation process of milk. The casein consists of soluble proteins also obtained by any separation process. The skim milk powder used consists of undenatured spray dried skim milk. The milk powder obtained through spray drying has a protein content between 40 and 95%. The pea or soya proteins used consist of undenatured, purified extracts, with the highest possible solubility index.

The denaturation of the proteins, together with the simultaneous presence of salt and sugar is necessary for the mayonnaise-like product according to the invention. The denaturation will be explained more deeply hereunder in relation with the process for the manufacture.

The product contains at least 0.1% milk proteins or vegetable proteins, more particularly between 0.1 and 5% of these proteins.

The type of oil used is not critical and can be of any edible oil, more particularly a vegetable oil including processed and refined oils like soya oil, sunflower oil, palm oil and coconut oil.

In a preferred embodiment of the mayonnaise-like product according to the invention, it contains from 70 to 80% soya oil, from 1 to 5% of proteins taken in the group consisting of whey proteins, skim milk powder, pea proteins and soya proteins, from 1 to 2% salt, from 1 to 5% sugar and from 3 to 10% vinegar.

In the case of higher fat contents and with any of the proteins mentioned above a further improvement of emulsion stability and texture is necessary. This improvement is possible by using a low molecular weight emulsifier which is taken from the group consisting of monoglycerides, ethoxylated monoglyceride, polyoxy-ethylene sorbitans, mono- and diesters of higher fatty acids and glycerin. Using these emulsifiers, the texture of the emulsion becomes more smooth and creamy. Furthermore, in case of emulsions based on skim milk powder, the emulsion stability is clearly improved.

The preferred low molecular weight emulsifier is polyoxyethylene-(20)-sorbitan monostearate. Generally, this low molecular weight emulsifier is present in an amount comprised between 0.01 and 2%. Preferably, this emulsifier is present in an amount of 0.1 to 0.2%.

According to the invention, with the emulsifiers, the protein and second emulsifier named above, it is possible to avoid precipitation caused by direct acidification and gelatinisation during storage, by heating in the presence of salt and sugar.

The product of the invention comprises furthermore any aroma, spices, vegetable and fruit pieces and thereby the viscosity normally used for this type of foodstuff.

Depending on the oil content, the mayonnaise-like product can be a spread or a salad-dressing.

As described above, the invention also concerns a process for the manufacture of a mayonnaise-like product. A for the first and the second types of high molecular weight emulsifiers, it is possible, respectively, to avoid precipitation caused by direct acidification and gelatinisation during storage, by heating the emulsifier in the presence of salt and sugar. The process according to the invention relates to the heat denaturation of the emulsifier (proteins), in the presence of salt and sugar, which prevents gel formation and enables direct acidification procedures.

As stated, according to the process of the invention, following steps are carried out:

preparing a solution in water containing 5 to 40% milk proteins or vegetable proteins, 5 to 40% sugar and 3 to 10% salt;

heating the mixture;

cooling the mixture;

acidifying the product obtained with acetic acid or with vinegar in an amount of from 0.1 to 20%; and homogenising the product with oil to obtain a fine emulsion.

The proteins and the oil used are the same as already mentioned in relation with the product.

Concerning the preparation of the basic water solution, to carry out the process it is preferable to have a protein content between 5 and 30%, a sugar content between 5 and 20% and a salt content between 5 and 10%. The preferred concentration of low molecular weight emulsifier is between 0.1 and 1%. In particular, polyoxyethylene-(20)-sorbitan monostearate and ethoxylated monoglycerides are used.

The heating step occurs at a temperature comprised between 50 and 140° C. during between 5 seconds and 30 minutes. Preferably, the heating occurs under continuous agitation at a temperature of 85° C., whereafter the product is maintained at this temperature for 1 to 5 minutes. The heating should effect a denaturation degree of the protein between 70 and 80%. The denaturation degree is determined by measuring the nitrogen solubility at pH 4.5 of a 5% solution of the heat treated mixture (Heat gelation of oil-in-water emulsions stabilised by whey protein, R. Jost and et al., J. Food Sci. 51(2), pages 440–444).

The cooling step is carried out at a temperature comprised between 1 to 40° C.

The acidification occurs to a pH value between 2 and 5. Any food grade acid can be used, particularly acetic acid or vinegar.

According to an embodiment of the process, a pre-emulsification with oil is made before the homogenising step to form a coarse emulsion. The pre-emulsification and homogenising step can be carried out with any suitable equipment existing on the market.

According to a further embodiment of the invention, vinegar and oil combined are emulsified and homogenised with the preheated water phase.

The process according to the invention has the advantage that the quantity of water is small relative to the oil phase, thereby allowing for convenient heating and acidification procedures, which facilitates industrial manufacturing of such products. The process according to the invention has the additional advantage that no thickeners like starches or gums are needed to obtain high viscosity.

EXAMPLES

The invention is further explained by the following examples.

Example 1

An aqueous phase, containing 22.2% skim milk powder, 7.2% salt, 16.6% sugar and 1.1% polyoxyethylene-(20)-sorbitan monostearate, was prepared. All the ingredients were mixed together in a Stephan batch mixer. The mixture was heated indirectly with steam to 85° C. and held at this temperature for 5 minutes, after which it was cooled down to 25° C., while scraping the surface continuously at an average speed. Then, vinegar was added to the mixture while stirring. The emulsion was prepared by gradually adding the oil to the water phase. A fine emulsion was obtained by passing through a colloid mill.

The emulsion has following composition:

| | |
|---|---|
| Soya oil | 75% |
| Skim milk powder | 4% |
| Vinegar (11% acetic acid) | 7% |
| Salt | 1.3% |
| Sugar | 3% |
| Polyoxyethylene-(20)-sorbitan monostearate | 0.2% |
| Water | 9.5% |
| Total | 100% |

The emulsion viscosity, stability and texture were compared to a reference sample. The following results were obtained:

| Emulsion | Viscosity (Pa.s) | Stability | Texture |
|---|---|---|---|
| Heated water phase | 8.1 | stable | smooth |
| Unheated water phase | 5.5 | oil separation | sandy |

Example 2

An aqueous phase, containing 6.3% whey protein concentrate (WPC)(60% protein), 6.3% salt and 14.6% sugar, was prepared. All the ingredients were mixed together in a Stephan batch mixer. The mixture was heated indirectly with steam to 85° C. and held at this temperature for 5 minutes, after which it was cooled down to 25° C., while scraping the surface continuously at an average speed. Then, vinegar was added to the mixture while stirring. The emulsion was prepared by gradually adding the oil to the water phase. A fine emulsion was obtained by passing it through a colloid mill.

The emulsion had following composition

| | | |
|---|---|---|
| Soya oil | 75% | |
| WPC | 1.3% | |
| Acetic acid (11%) | 4.5% | |
| salt | 1.3% | |
| sugar | 3% | |
| water | 14.9% | |
| Total | 100% | |

The emulsion viscosity, stability and texture were compared to an emulsion of which the water phase was not heated. The viscosity was determined at 20° C. using a Bohlin CS 50 rheometer at a shear rate of 10 m/sec. The samples were checked for texture and oil separation after 3 months at 32° C.

| Emulsion | Viscosity (Pa.s) | Stability | Texture |
|---|---|---|---|
| Heated waterphase | 15.23 | stable | smooth |
| Unheated waterphase | 17.54 | oil separation | gelatinised |

Example 3

An aqueous phase, containing 8.7% pea protein (95% protein), 5.6% salt, 13% sugar and 0.4% ethoxylated monoglyceride, was prepared.

The same procedure as for Example 1 was carried out, except for the indirect heating, which was done at 60° C.

The viscosity of the product was 4.9 Pa.s and the stability and texture were unchanged after 3 months storage at 32° C. The preparation of a 70% oil-in-water emulsion was not possible with the unheated reference.

Similar results were obtained when ethoxylated monoglyceride is replaced by polyoxyethylene-(20)-sorbitan monostearate.

Example 4

An aqueous phase, containing 8.7% soya protein (95% protein), 5.6% salt, 13% sugar and 0.8% polyoxyethylene-(20)-sorbitan monostearate, was prepared.

The preparation of the emulsion was carried out as in Example 1.

The viscosity of the product was 4 Pa.s and the stability and texture were unchanged after 3 months storage at 32° C. The preparation of a 70% oil-in-water emulsion was not possible with the unheated reference.

Similar results were obtained when polyoxyethylene-(20)-sorbitan monostearate is replaced by ethoxylated monoglyceride in the recipe.

We claim:

1. A process for preparing a mayonnaise-like product comprising:

preparing a mixture comprising water, sugar, salt and a first emulsifier and a second emulsifier wherein the mixture is prepared so that, by weight, based upon mixture weight, the sugar is in an amount of from 10% to 40%, the salt is in an amount of from 5% to 10%, the first emulsifier is undenatured proteins and is in an amount of from 5% to 40% and wherein the emulsifier proteins are selected from the group consisting of vegetable proteins and a milk substance comprising milk proteins and wherein the vegetable proteins are selected from the group consisting of soya protein and pea protein and wherein the milk substance is selected from the group consisting of buttermilk, skimmed milk powder and casein and wherein the second emulsifier is selected from the group consisting of monoglycerides, ethoxylated monoglycerides, polyoxyethylene sorbitans, glycerin and fatty acid monoesters and fatty acid diesters;

heating the mixture to denature proteins in the mixture which are heat-denaturable to a degree of denaturation between 70% and 80% to obtain a heat-treated mixture;

cooling the heat-treated mixture to obtain a cooled mixture;

adding an acidifying agent to the cooled mixture to obtain an acidified mixture wherein the acidifying agent is selected from the group consisting of vinegar and acetic acid and wherein the acidifying agent is added in an amount, by weight based upon the acidified mixture weight, of from 0.1% to 20% so that the acidified mixture has a pH of between 2 and 5;

adding an edible oil to the acidified mixture to obtain an acidified oil-containing product; and homogenizing the acidified oil-containing product to obtain an emulsion.

2. A process according to claim 1 wherein the oil is added in an amount so that the oil-containing product contains, by weight, between 70% and 80% oil.

3. A process according to claim 1 or 2 wherein the mixture is prepared so that the second emulsifier is in an amount, by weight, between 0.1% and 1%.

4. A process according to claim 1 or 2 wherein the first emulsifier is skimmed milk powder.

5. The emulsion product of the process of claim 4.

6. A process according to claim 1 wherein the first emulsifier comprises vegetable proteins selected from the group consisting of pea proteins and soya proteins.

7. A process according to claim 1 wherein the second emulsifier is an emulsifier selected from the group consisting of polyoxyethylene-(20)-sorbitan monostearate and ethoxylated monoglycerides.

8. The emulsion product of the process of claim 7.

9. A process according to claim 1 wherein the second emulsifier comprises polyoxyethylene-(20)-sorbitan monostearate.

10. A process according to claim 1 wherein the mixture is prepared so that the first emulsifier is in an amount between 5% and 20%, the salt is in an amount between 5% and 10% and the second emulsifier is in an amount, by weight, between 0.1% and 1%.

11. A process according to claim 1 wherein the mixture is heated at a temperature between 50° C. and 140° C. for between 5 seconds and 30 minutes to obtain the heat-treated mixture.

12. A process according to claim 1 or 11 wherein the heat-treated mixture is cooled to a temperature between 1° C. and 40° C.

13. A process according to claim 1 further comprising, prior to homogenizing, adding the oil to the acidified mixture and emulsifying the oil-containing product and then homogenizing the emulsified oil-containing product.

14. A process according to claim 1 further comprising, prior to adding the acidifying agent and the oil, combining and emulsifying the acidifying agent and the oil to obtain an emulsion and then adding the emulsion to the cooled mixture to obtain the acidified oil-containing product and then homogenizing the acidified oil-containing product.

15. A process according to claim 1 wherein the acidifying agent is vinegar.

16. A process according to claim 1 wherein the oil is a vegetable oil.

17. A process according to claim 1 wherein the emulsion product is prepared without and does not contain egg yolk or a gum.

18. The emulsion product of the process of claim 17.

19. The emulsion product of the process of claim 1.

20. A mayonnaise—like emulsion composition which comprises components of an edible oil, sugar, salt, water and an acidifying agent and a first emulsifier and a second emulsifier and which does not comprise egg yolk or a gum and wherein, with reference to weight percent based upon emulsion weight the oil component is in an amount of from 55% to 85%;

the sugar component is in an amount of at least 1%;

the salt component is in an amount of at least 0.5%;

the first emulsifier component is selected from the group consisting of vegetable proteins and a milk substance comprising milk proteins wherein the vegetable proteins are selected from the group consisting of soya protein and pea protein and wherein the milk substance is selected from the group consisting of buttermilk, skimmed milk powder and casein and wherein the first emulsifier is in an amount of at least 0.1% and wherein heat-denaturable proteins of the first emulsifier are denatured to a degree of denaturation between 70% and 80%;

the second emulsifier component is selected from the group consisting of monoglycerides, ethoxylated monoglycerides, polyoxyethylene sorbitans, glycerin and fatty acid monoesters and fatty acid diesters; and the acidifying agent component is selected from the group consisting of acetic acid and vinegar and is in an amount of from 0.1% to 20% for providing an emulsion pH of from 2 to 5.

21. An emulsion composition according to claim 20 wherein the first emulsifier component is in an amount between 0.1% and 5%.

22. A composition according to claim 20 wherein the oil component is selected from the group consisting of soya oil, sunflower oil, palm oil and coconut oil.

23. A composition according to claim 20 wherein the oil component comprises soya oil and is in an amount of from 70% to 80%, the first emulsifier component is in an amount of from 1% to 5%, the sugar component is in an amount of from 1% to 5%, the salt component is in an amount of from 1% to 2% and wherein the acidifying agent is vinegar and is in an amount of from 3% to 10%.

24. A composition according to claim 20 or 23 wherein the second emulsifier is selected from the group consisting of polyoxyethylene-(20)-sorbitan monostearate and ethoxylated monoglycerides.

25. A composition according to claim 20 or 23 wherein the second emulsifier comprises polyoxethylene-(20)-sorbitan monosterate in an amount between 0.01% and 2%.

* * * * *